July 30, 1968  YOSHINO KAJIYAMA  3,395,303
ELECTRON GUN HAVING BEAM DIVERGENCE LIMITING ELECTRODE
FOR MINIMIZING UNDESIRED SECONDARY EMISSION
Filed June 30, 1966
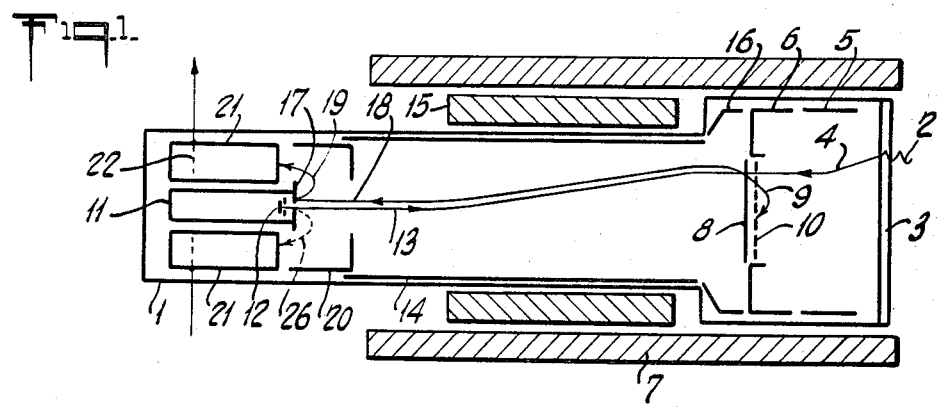
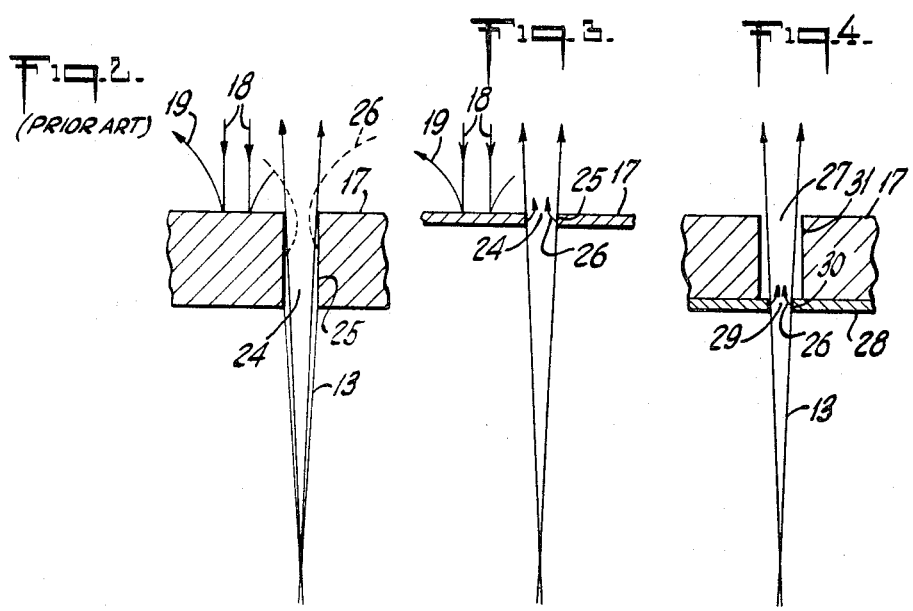
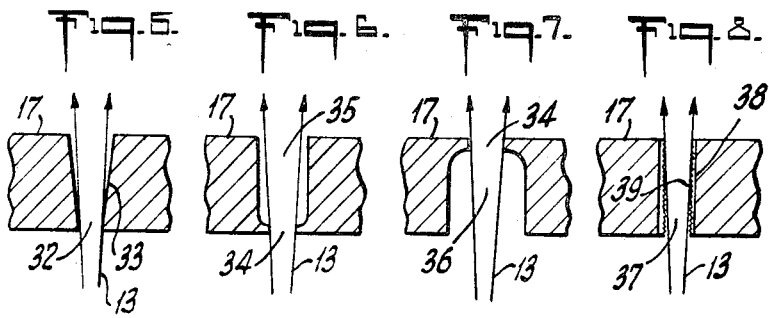
INVENTOR
YOSHINO KAJIYAMA
BY
Hopgood & Calimafde
ATTORNEYS

United States Patent Office 3,395,303
Patented July 30, 1968

3,395,303
ELECTRON GUN HAVING BEAM DIVERGENCE LIMITING ELECTRODE FOR MINIMIZING UNDESIRED SECONDARY EMISSION
Yoshino Kajiyama, Tokyo, Japan, assignor to Nippon Electric Company, Limited, Tokyo, Japan, a corporation of Japan
Filed June 30, 1966, Ser. No. 561,793
Claims priority, application Japan, July 8, 1965, 40/41,010
3 Claims. (Cl. 313—67)

ABSTRACT OF THE DISCLOSURE

A camera tube structure having a significantly improved signal to noise ratio resulting from a novel beam divergence angle limiting electrode structure designed to reduce stray secondary electron emission from the side wall thereof when bombarded by the electron beam.

---

This invention relates to camera tubes and more particularly to a camera tube in which the signal to noise ratio is substantially improved.

It is generally known that the signal to noise ratio of a conventional camera tube, such as an image orthicon, is proportional to the square root of the degree of beam modulation measured at the anode output. However, the degree of beam modulation of a conventional image orthicon is insufficiently high, and consequntly, its signal to noise ratio is considerably less than desired, and as a result, the pickup operation of this tube is not entirely satisfactory.

Accordingly, it is an object of this invention to provide a camera tube having an improved signal-to-noise ratio.

Another object of this invention is to provide such an improved camera tube wherein the improved signal-to-noise ratio is achieved by employing a higher degree of beam modulation.

All of the objects, features and advantages of this invention and the manner of attaining them will become more apparent and the invention itself will be best understood by reference to the following description of the invention taken in conjunction with the accompanying drawing, in which:

FIG. 1 is a longitudinal sectional view of an image orthicon in accordance with one embodiment of the present invention, and illustrating the operation thereof;

FIG. 2 is an enlarged view of the dynode portion of an image orthicon of the conventional type;

FIG. 3 shows an enlarged view of the first dynode portion in FIG. 1; and

FIGS. 4 to 7 show enlarged views of the first dynode portions of image orthicons of other embodiments of this invention.

In the drawing, the same numerals designate similar parts in the different figures.

According to the present invention, there is provided a camera tube which includes a beam divergence angle limiting electrode wherein the thickness of the limiting aperture portion which receives bombardment by the primary electron current is substantially reduced. This results in improvement of the signal-to-noise ratio by reducing the stray secondary electron emission from the side wall of the limiting aperture of this electrode.

Further according to this invention, a camera tube is provided having an improved signal-to-noise ratio that is made possible by the provision of the beam divergence angle limiting electrode referred to above, which consists of an electron beam limiting aperture portion with an extremely reduced thickness that receives bombardment by the primary electron current, and also a screening aperture portion having a diameter slightly larger than that of the electron beam limiting aperture and is so constructed that it is not directly bombarded by the primary electron beam. As a result, the overflow of stray secondary electrons generated in the limiting aperture portion by the screening action of the screening aperture portion is prevented.

Still further according to the present invention, a camera tube having a large signal-to-noise ratio is obtained by the provision of a beam divergence angle limiting electrode, the inside wall of the limiting aperture portion which is subjected to the bombardment of the primary electron current being coated with a substance having a small secondary electron emission ratio characteristic, thereby reducing the stray secondary electrons from the side wall. As already mentioned, the signal-to-noise ratio of a camera tube is determined by the degree of beam modulation. There are various reasons for reducing the degree of beam modulation, and I have found that the stray secondary electron current is one of the important factors. In this context, the so-called stray secondary electron current is defined as a secondary electron current which flows outside of an electron gun by the bombardment of a primary electron beam. In an image orthicon, such stray secondary electrons are emitted at the inside wall of the first dynode aperture and enter directly into a secondary electron multiplier, rather than being supplied to a target electrode. The beam modulation degree $M'$ measured at the anode output when a stray secondary electron current $i_{st}$ is in existence is:

$$M' = \frac{M}{1 + \dfrac{i_{st}}{i_b \cdot \delta_1}} \qquad (1)$$

where $i_b$ is the scanning beam current, $\delta_1$ is the gain of the first dynode, and $M$ is the genuine degree of beam modulation when there is no secondary electron current $i_{st}$.

Heretofore, the existence of such a stray secondary electron current $i_{st}$ has not been confirmed, and the supposed existence of any such current was regarded as a negligibly small amount. The reason was that it was difficult to measure a stray secondary electron current separately from the normal scanning beam. The inventor has discovered, however, as a result of collecting such current at separate electrodes by utilizing the difference in energy of the scanning beam current and the stray secondary electron current, that the value of the ratio $i_{st}/i_b.\delta_1$ is distributed between 0.1 and 0.4. Accordingly, the degree of beam modulation of a conventional type image orthicon is lower than the genuine beam modulation degree $M$ by 10–40%, which means that the signal-to-noise ratio is lower than the original signal-to-noise ratio by 5–20%.

The invention will now be explained with specific reference to the drawings. Referring first to FIG. 1, there is shown an image orthicon housed in a glass tube 1, and in which photoelectrons 4 generated in a photo cathode 3 by means of an incident signal light 2 are focussed on a target electrode 8 by means of an electromagnetic lens, thereby producing secondary electrons 9. The magnetic lens includes a focussing coil 7 provided at the outside of an accelerating electrode 5 and a target cap 6. The secondary electrons 9 are collected by a mesh electrode 10, and this results in a positive electric charge pattern being stored on the target electrode 8 which corresponds to the signal light 2.

An electron beam 13 is emitted from the cathode 12 of the electron gun 11 and is deflected by a deflecting coil 15 provided at the outside of the tube 1, while being focussed by means of a focussing electrode 14 and the focussing coil 7. This beam 13 is subsequently decelerated by a decelerating electrode 16, and upon reaching the target electrode 8 discharges the stored electric charge thereon. As a result, an electron beam 18 of surplus electrons is returned toward the beam divergence angle limiting electrode or first dynode 17, provided at the tip of the electron gun 11. This in turn causes secondary electrons 19 to be generated at the first dynode 17. The returned electron beam 18 is modulated by the electric charge of the target electrode 8 and therefore contains picture signals, which results in modulation of the secondary electrons 19. The modulated secondary electrons 19 that are thus generated at the first dynode 17 are turned by the electric field formed by an electrode 20 provided for that purpose and the adjoining electrodes, so that these electrons engage a secondary electron multiplier 21. This results in multiplier action and an amplified picture signal output 23 is then obtained from the anode 22.

Further discussion of the passage of the electron beam 13 through the first dynode 17 will now be explained in connection with FIG. 2, which shows an enlarged fragmentary view of the first dynode 17 of a conventional image orthicon, and FIG. 3, which shows an enlarged view of the same portion of an image orthicon embodying the present invention. The first dynode structures 17 shown in FIGS. 2–8 may be employed in a tube structure having the general arrangement seen in FIG. 1, and reference to the various other tube elements of FIG. 1 will be made during the description of these figures which now follows.

Referring now specifically to FIG. 2, a conventional first dynode structure 17 is shown wherein an electron beam limiting aperture 24 is usually provided by making an aperture of columnar shape, with a diameter of approximately 40 microns. This dynode 17 is preferably made of a silver plated member gilded with chrome and having a thickness generally in the range of 120–150 microns. Accordingly, inasmuch as the electron beam 13 directly strikes the whole surface of the side wall 25 of the limiting aperture 24, stray secondary electrons 26 ($i_{st}$) that have not been modulated are emitted; these are indicated by the dashed lines seen in FIG. 2. These stray secondary electrons 26 travel a path substantially the same as the normal modulated secondary electrons 19 ($i_b\delta_1$) indicated by the dashed line 26 in FIG. 1 (seen on the opposite side in said FIG. 1) and enter into the secondary electron multiplier 21 of FIG. 1. After multiplicaiton, these stray secondary electrons 26 result in a DC current from the anode 22 of FIG. 1. Consequently, such stray secondary electrons do not contribute to the signal, and therefore, lower the degree of beam modulation measured at the anode, at the rate indicated in Expression 1 above. This results in lowering the signal-to-noise ratio.

Referring now to FIG. 3, the first dynode 17 of an image orthicon according to one embodiment of this invention is shown, which comprises a tantalum plate having a thickness of approximately 15 microns. In this case, inasmuch as the dimension of the inside wall 25 of the limiting aperture 24 is extremely small, the amount of stray secondary electrons 26 entering into the secondary electron multiplier 21 of FIG. 1 is decreased to approximately 3% with respect to the modulated secondary electrons 19 generated directly by the returned electron beam 18. This is a considerable decrease when compared with the case of a conventional type image orthicon, whose stray secondary electron current ratio against the modulated secondary electron current is 10 to 40%.

It is important to note that since the first dynode 17 of FIG. 3 consists of a very thin metal plate, it is difficult to maintain its proper shape, even when made of such a hard metal as tantalum. Consequently, it is designed to be supported by a supporting plate (not shown) which comprises a nichrome plate having a thickness of approximately 0.4 mm. with an aperture of approximately 1 mm. diameter. It should be noted, however, that when determining the thickness of the first dynode in a conventional image orthicon, no consideration was given to intentionally reducing the thickness of the dynode even when employing a metal of high strength, because the existence and harmful results of the stray secondary electrons had not been recognized heretofore.

FIG. 4 shows another image orthicon embodying this invention in which a first dynode 17 is made of a silver plated structure gilded with chrome. This dynode 17 plated structure has a thickness of approximately 0.15 mm., and includes a screening aperture 27 having a diameter of about 60 microns. An apertured electrode plate 28 of tantalum with a thickness of approximately 10 microns is mounted in contact with or adjacent to the first dynode 17, and has a limiting aperture 29 of approximately 40 microns. With such a structure, the side wall area 30 of the aperture 29, which is subjected to primary electron bombardment, becomes extremely small, and the amount of stray secondary electrons 26 which enter into the secondary electron multiplier portion 21 of the tube structure is extremely reduced because the side wall 31 of the screening aperture 27 has the effect of screening a considerable portion of the secondary electrons emitted from the side wall 30, thereby decreasing the modulated secondary electrons 19 to a value of approximately 1.5%. As a consequence, the signal-to-noise ratio is improved nearly 20%. The significant improvements of the present invention will readily be understood when one considers the fact that the ratio of the stray secondary electrons 26 to the signal modulation secondary electrons 19 is 10%–40% in the conventional image orthicon structure.

In another embodiment, shown in FIG. 5, it is possible to attain substantially the same effects as with the embodiment in FIG. 4 by providing a limiting aperture 32 of conical shape on the first dynode 17, thereby preventing the primary electron beam 13 from striking the side wall 33. It is necessary, however, to make the vertical angle of the cone larger than the 2° usually employed in an ordinary image orthicon.

Still another embodiment of this invention is shown in FIG. 6, wherein the apertures of the first dynode 17 are made in such a way that the end portion on the side of the cathode 12 of FIG. 1 is made in the form of a limiting aperture 34 with a diameter of approximately 40 microns, while the larger portion on the opposite side is made the screening aperture having a diameter of approximately 60 microns. By means of this structure, substantially the same advantages as described in connection with FIG. 4 are obtained.

In yet another embodiment shown in FIG. 7, the apertures of the first dynode 17 are made in such way that the end portion on the side of the target electrode 8 is made a limiting aperture having a diameter of approximately 40 microns, while the larger portion on the opposite side is made a wider aperture 36 having a diameter of approximately 100 microns. In this structure, the wider aperture 36 produces no screening effect and therefore, the overall effect or operation is substantially the same as the embodiment of FIG. 3.

In FIG. 8 there is shown an entirely different embodiment of the invention. According to this structure, the limiting aperture 37 of the first dynode may be made generally of conventional shape, but in the region of stray secondary electron emission, i.e., in the region of the inside wall 38 of the aperture, a coating 39 is provided whose secondary electron emission ratio is less than 1, in order to prevent the emission of stray secondary electrons. Examples of such a coating are porous carbon, powdered zircon, and the like. Originally, due to the fact that a cathode material is evaporated on the side wall of the first dynode aperture during the fabrication process of the tube, its secondary electron emission ratio is much larger than 1. Even if the inside wall of the first dynode aperture is pre-coated with a material having a low secondary electron emission ratio, a cathode type material will be evaporated thereon during fabrication of the tube, thus increasing the secondary electron emission ratio. Nevertheless, as indicated in the embodiment of FIG. 8, by coating a material such as porous carbon on the inside wall of the first dynode aperture by means, for instance, of a carbon arc in an inactive gas atmosphere, it has been found that the secondary electron emission ratio does not increase more than several percent even when a cathode material is evaporated thereon. It has also been found that unevenness of the surface is a more significant factor in preventing the secondary electron emission of a porous surface rather than the kind of material that is used.

Although the above embodiments have been described with specific reference to the image orthicon tube, it is to be observed that the same teachings are applicable to all types of camera tubes employing electron beams.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:
1. A camera tube comprising means for storing an electric charge pattern of a visual presentation comprising
   a cathode for generating an electron beam to read out the stored pattern,
   a beam divergence angle limiting electrode having an aperture for limiting said electron beam,
   said aperture having a side wall which produces stray secondary electron emission upon impingement thereon of electrons from said beam as the same passes through said aperture,
   said electrode including a planar portion of metallic material with its plane disposed generally perpendicular to the direction of said electron beam,
   said aperture being formed in said planar portion,
   said planar portion in the region immediately adjacent to said aperture having a thinness so small as to require support close to said aperture so that said planar portion will maintain its shape during normal operation,
   said electrode further including a supporting portion close to said aperture and integral with said planar portion to support the same as aforesaid,
   and said supporting portion having an aperture therein that is generally concentric with and larger than the aperture in said planar portion so that said electron beam cannot strike the side wall thereof, whereby the stray secondary electron emission generated by the bombardment of said electron beam is markedly reduced and whereby the degree of beam modulation and also the signal-to-noise ratio of said tube are significantly improved.

2. The invention described in claim 1 wherein
   the thinness of said planar portion is a small fraction of the thickness of conventional beam divergence angle limiting electrodes and may be generally of the order of 10–15 microns.

3. The invention described in claim 1 wherein
   said planar portion of said electrode is located on the side thereof closest to the cathode.

References Cited
UNITED STATES PATENTS

| | | | |
|---|---|---|---|
| 2,186,636 | 1/1940 | Gorlich | 313—65 |
| 2,831,144 | 4/1958 | Gibson | 313—65 |
| 3,252,034 | 5/1966 | Preist et al. | 313—107 |
| 3,313,977 | 4/1967 | Gebel | 313—65 X |

ROBERT SEGAL, *Primary Examiner.*